United States Patent [19]
de Cambray et al.

[11] Patent Number: 5,548,954
[45] Date of Patent: Aug. 27, 1996

[54] TURBOJET ENGINE THRUST REVERSER WITH REAR SUPPORT STRUCTURE

[75] Inventors: Elisabeth L. F. C. de Cambray, Le Havre; Laurent M. Vicogne, Gonfreville L'Orcher, both of France

[73] Assignee: Societe Hispano Suiza, Saint Cloud Cedex, France

[21] Appl. No.: 348,094

[22] Filed: Nov. 25, 1994

[30] Foreign Application Priority Data

Nov. 24, 1993 [FR] France ............... 93 14036

[51] Int. Cl.⁶ ............................................. F02K 3/02
[52] U.S. Cl. .................... 60/226.2; 60/230; 244/110.13; 239/265.29
[58] Field of Search ............... 60/226.2, 230; 239/265.27, 265.29; 244/110 B

[56] References Cited

U.S. PATENT DOCUMENTS

| | | |
|---|---|---|
| 3,172,256 | 3/1965 | Kerry et al. . |
| 3,262,270 | 7/1966 | Beavers ............................. 60/230 |
| 3,279,181 | 10/1966 | Beavers et al. ................... 60/262.2 |
| 3,600,894 | 8/1971 | McClain ............................. 60/230 |
| 3,610,533 | 10/1971 | Johnson ............................. 60/230 |
| 3,614,037 | 10/1971 | Vdolek . |
| 3,747,855 | 7/1973 | Vdoviak et al. ................... 239/265.29 |
| 3,815,357 | 6/1974 | Brennan ............................. 60/262.2 |
| 3,831,376 | 8/1974 | Moorehead ........................ 60/226.2 |
| 4,026,105 | 5/1977 | James ................................. 60/230 |
| 4,030,291 | 6/1977 | Sargisson . |
| 4,407,120 | 10/1983 | Timms ............................... 60/262.2 |
| 4,858,430 | 8/1989 | Belbouche . |
| 4,894,985 | 1/1990 | Dubois et al. . |
| 4,914,905 | 4/1990 | Dubois et al. . |
| 4,916,895 | 4/1990 | Dubois . |
| 4,960,243 | 10/1990 | Dubois et al. . |
| 4,976,466 | 12/1990 | Vauchel . |
| 5,039,171 | 8/1991 | Lore . |
| 5,046,307 | 9/1991 | Matta et al. ...................... 60/262.2 |
| 5,235,807 | 8/1993 | Nightingale .................... 239/265.29 |

FOREIGN PATENT DOCUMENTS

| | | |
|---|---|---|
| 2146109 | 3/1973 | France . |
| 2618852 | 2/1989 | France . |
| 2618853 | 2/1989 | France . |
| 2621082 | 3/1989 | France . |
| 2625261 | 6/1989 | France ............................ 60/262.2 |
| 2627807 | 9/1989 | France . |
| 2634251 | 1/1990 | France . |
| 2638207 | 4/1990 | France . |
| 2651021 | 2/1991 | France . |
| 2823206 | 6/1979 | Germany ..................... 239/265.29 |
| 812950 | 3/1981 | U.S.S.R. .......................... 60/230 |

Primary Examiner—Richard A. Bertsch
Assistant Examiner—Teo Kim
Attorney, Agent, or Firm—Bacon & Thomas

[57] ABSTRACT

A thrust reverser for a turbojet engine is disclosed in which the actuator for the thrust reverser is attached to a second support frame located downstream of the reverse thrust opening. A plurality of longitudinally extending beams interconnect the downstream support frame to an upstream support frame which is located upstream of the reverse thrust opening. A cylinder of the actuating device is attached to the downstream support frame and the extendible and retractable piston rod is attached to the moveable thrust reverser element. The location of the actuating device allows for a better stress distribution and enables the weight to be reduced as compared to prior art thrust reversers.

5 Claims, 3 Drawing Sheets

TURBOJET ENGINE THRUST REVERSER WITH REAR SUPPORT STRUCTURE

BACKGROUND OF THE INVENTION

The present invention relates to a thrust reverser for a turbofan-type turbojet engine, more particularly such a thrust reverser having a rear support frame to which the thrust reverser actuator is attached.

Turbojet engines of the turbofan-type are well known in the art and typically comprise a primary exhaust gas duct to exhaust the high temperature gases and a secondary duct concentrically located about the primary gas exhaust duct so as to define an annular space therebetween. Turbofans, typically mounted on the front of the engine, direct air through this annular space to increase the performance characteristics of the engine.

In such turbofan engines, particularly those having a high bypass ratio, it is known to provide a thrust reverser which acts primarily or solely on the cold air passing through the secondary duct. A typical thrust reverser structure is illustrated in FIGS. 1 and 2 and comprises an upstream structure 101, a moveable thrust reverser element 102 and a downstream or rear collar 103 which is attached to the upstream structure 101. The stationary upstream structure 101 comprises an outer panel 104 which defines an outer flow surface and an inner panel 105 which defines an inner flow surface and which bounds the outer portion of the cold flow secondary duct. These panels are interconnected by a generally annular frame 106 which extends about the longitudinal axis L.

The frame 106 also is attached to the thrust reverser actuator 107a which has an extendible and retractable piston rod attached to a pivotable thrust reverser door 107 so as to move the door between its forward thrust position, illustrated in FIG. 1, and its reverse thrust position, illustrated in FIG. 2. The number of movable thrust reverser doors 107 will, of course, vary according to the particular application of the turbojet engine, and typically comprises 2, 3 or 4 such doors 107.

The thrust reverser door 107 also comprises an outer door panel 109 which, in the forward thrust position, is generally flush with the outer panel 104 and the outer surface of rear collar 103 so as to provide a smooth surface for the flow of air, indicated by arrow 110. Door 107 also has inner panel 111 and structure 112 which interconnects the outer and inner door panels 109 and 111, along with upstream baffle 113. The inner door panel 111 is located obliquely to the line 114 interconnecting the inner panel 105 and the inner surface of the rear collar 103 so as to define space 116 along with deflection edge 108. The air flow through the secondary duct is indicated by arrow 115 and passes from an upstream direction (towards the left as illustrated in FIG. 1) towards a downstream direction (towards the right as illustrated in FIG. 1).

FIG. 2 partially illustrates the turbofan duct with the thrust reverser doors 107 in their open or reversed thrust positions. The movement of the doors 107 between their open and closed positions is achieved by actuating cylinders 107a which have an extendible and retractable piston rod connected to the thrust reverser door 107 and the actuating cylinder attached to the support 106, located upstream of the reverse thrust opening.

Examples of known thrust reversers can be found in French patents 2,618,853; 2,618,852; 2,621,082; 2,627,807; 2,634,251; 2,638,207; and 2,651,021.

In all of these known thrust reversers, the upstream frame 106 is connected to the rear collar 103 via beams 9a. Since the frame 106 also supports the actuators 107a, it must absorb all of the mechanical stresses due to the structure's mass and inertia, as well as aerodynamic stresses imparted on the engine itself. This requires the front frame 106 to have increased strength which, inherently, increases the weight of the support and aircraft engine.

SUMMARY OF THE INVENTION

A thrust reverser for a turbojet engine is disclosed in which the actuator for the thrust reverser is attached to a second support frame located downstream of the reverse thrust opening. A plurality of longitudinally extending beams interconnect the downstream support frame to an upstream support frame which is located upstream of the reverse thrust opening. A cylinder of the actuating device is attached to the downstream support frame and the extendible and retractable piston rod is attached to the moveable thrust reverser element.

The structure according to this invention achieves a better stress distribution than the structures of the known thrust reversers and enables the overall weight of the turbojet engine to be reduced.

DETAILED DESCRIPTION OF THE PREFERRED EMBODIMENTS

Figure 1:
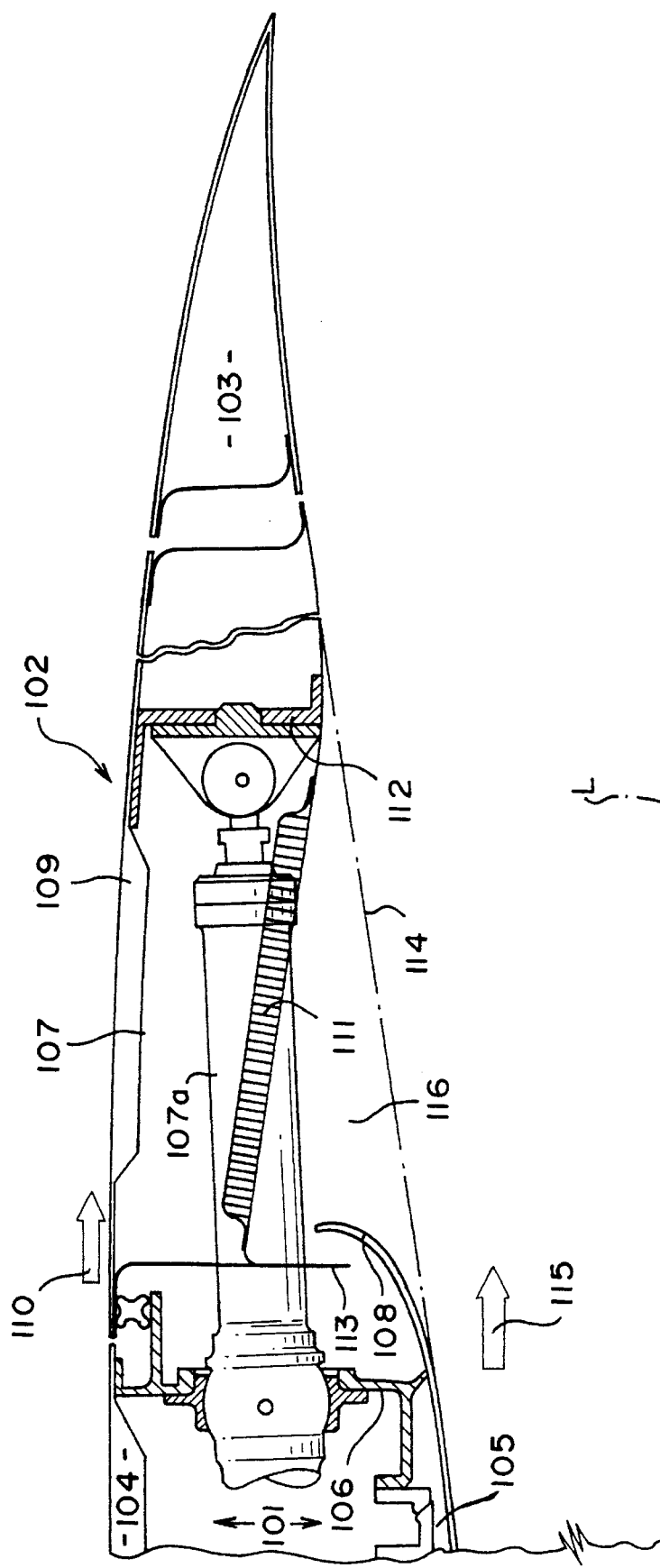
FIG. 1 is a partial, cross-sectional view of a known thrust reverser with the door in the closed, forward thrust position.
Figure 2:
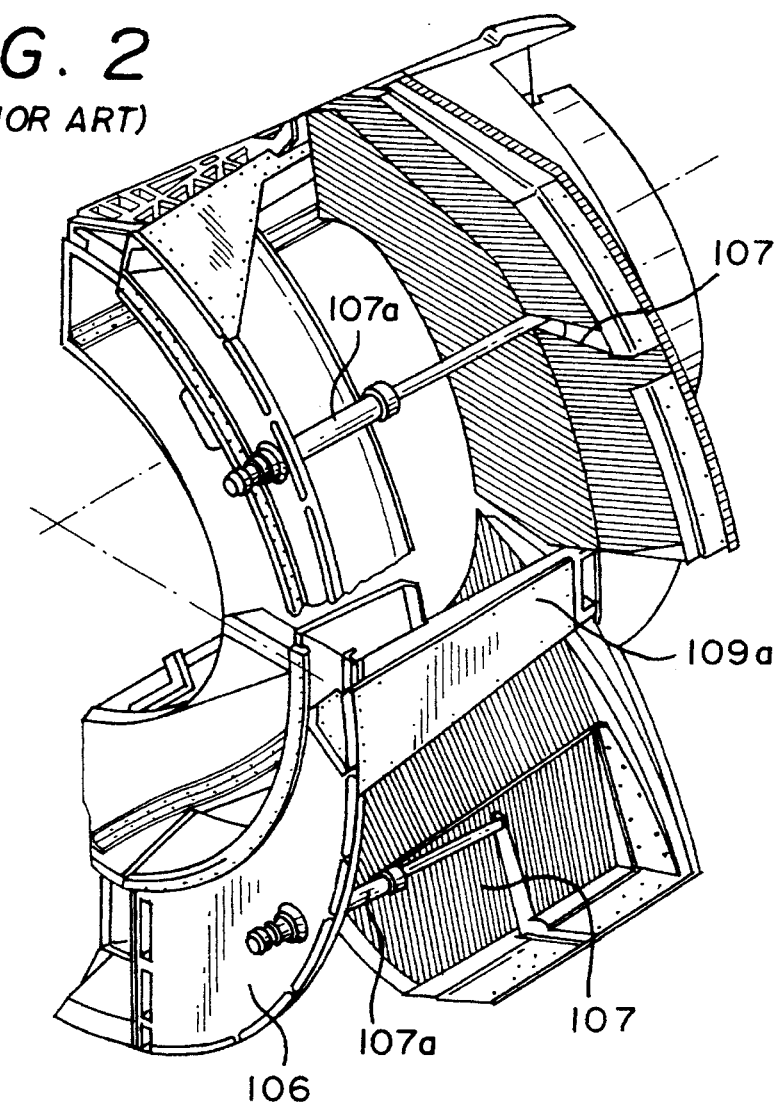
FIG. 2 is a partial, perspective view of the known thrust reverser illustrating the thrust reverser doors in their reverse thrust positions.
Figure 3:
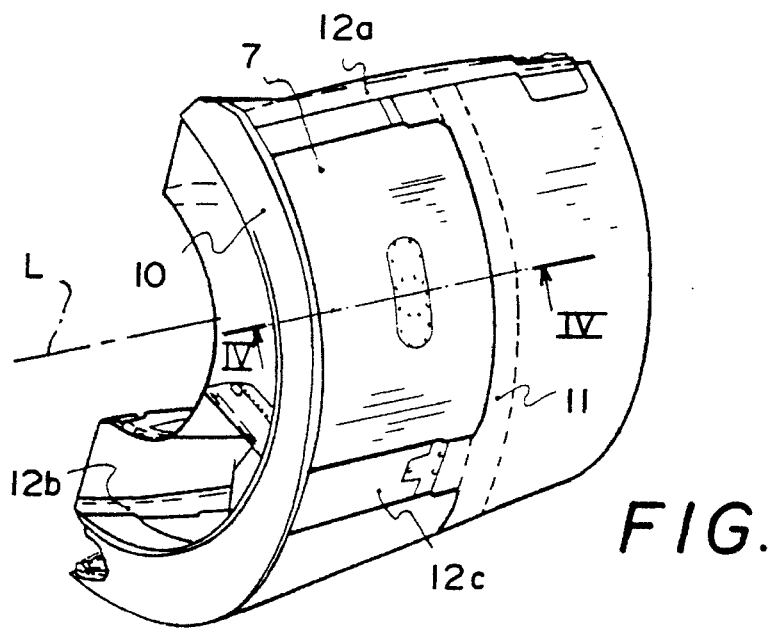
FIG. 3 is a partial, perspective view of the thrust reverser according to the present invention with the thrust reverser elements in their closed, forward thrust positions.
Figure 4:
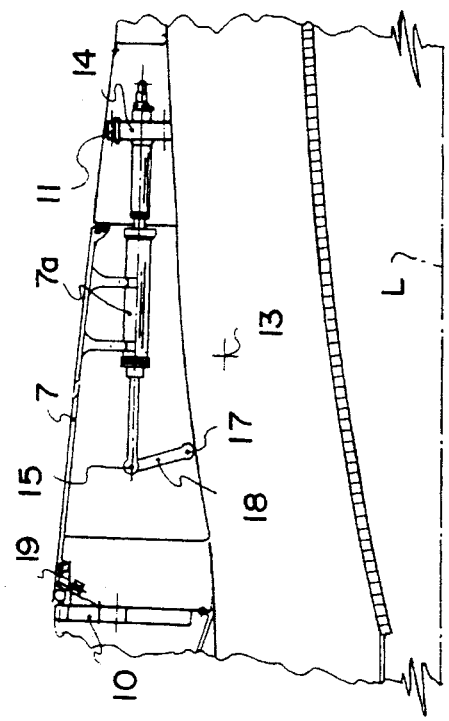
FIG. 4 is a partial, cross-sectional view of a first embodiment of the thrust reverser according to the present invention with the thrust reverser door in its closed, forward thrust position.
Figure 5:
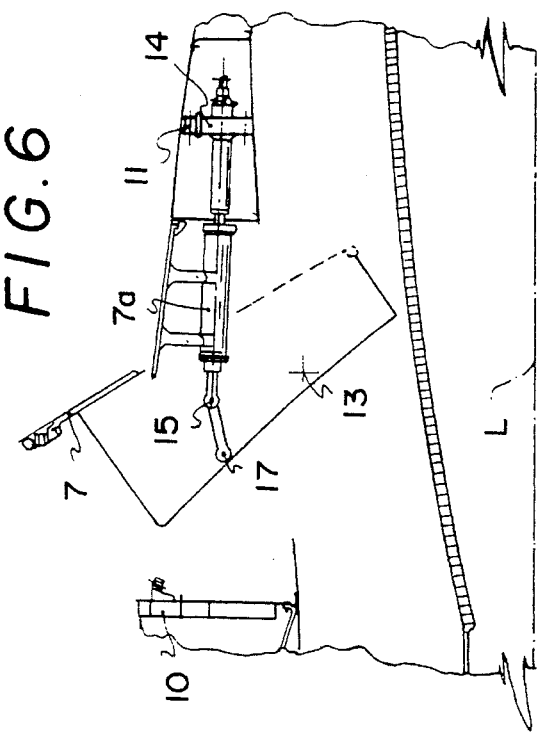
FIG. 5 is a partial, cross-sectional view similar to FIG. 4, illustrating the thrust reverser door in its open, reverse thrust position.

As illustrated in FIG. 3, the thrust reverser according to the present invention comprises a front support-frame 10 extending generally transversely to the longitudinal axis L of the jet engine duct, as well as a rear, downstream frame 11, also extending generally transversely to the longitudinal axis. The front frame 10 is located upstream of a thrust reverser opening defined by the duct and the rear frame 11 is located downstream of the reverse thrust opening. The front and rear frames 10 and 11 are connected by a plurality of beams 12a, 12b and 12c which extend in a longitudinal direction generally parallel to the longitudinal axis L. Although only three such longitudinal beams are illustrated, more or less may be utilized depending upon the particular structure of an individual turbojet engine.

The structural components 10, 11 and 12 form the support framework for moveable thrust reverser elements, such as doors 7. The terms "front" and "rear" correspond to the "upstream" and "downstream" edges of the thrust reverser opening defined in relation to the normal direction of the flow of gases through the turbojet engine when the thrust reverser is in its forward thrust position.

Each of the moveable thrust reverser elements or doors 7 is pivotally attached to the duct so as to pivot about an axis 13 extending generally transversely to the longitudinal axis L, as illustrated in FIGS. 4–7. The thrust reverser doors 7 are moved by actuators 7a between the closed, forward thrust position, illustrated in FIG. 4, and the open, reverse thrust position illustrated in FIG. 5. In accordance with the principles of the present invention, the actuators 7a are fixed at 14 to the rear or downstream support frame 11. The extendible and retractable piston rod of the actuator 7a is attached to the thrust reverser door 7 by pivot connection 15. To achieve the open, reverse thrust position illustrated in FIG. 5, the pull of the piston rod of the actuator 7a as it is being retracted on the pivot joint 15 causes the thrust reverser door 7 to pivot about the axis 13. Extension of the piston rod of the actuator 7a causes the thrust reverser door to return to its forward thrust position illustrated in FIG. 4.

Figure 6:
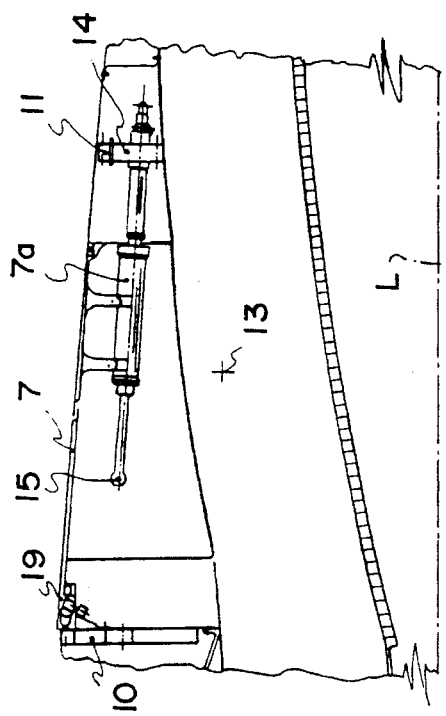
FIG. 6 is a partial, cross-sectional view similar to FIG. 4, illustrating a second embodiment of the thrust reverser according to the present invention.
Figure 7:
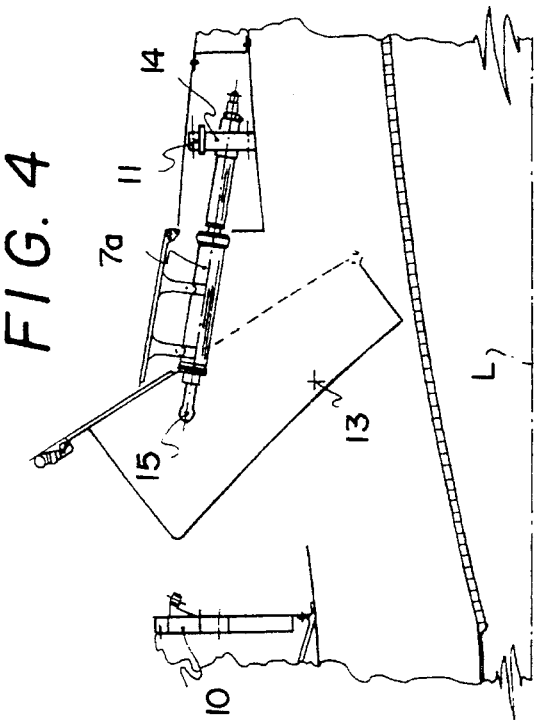
FIG. 7 is a partial, cross-sectional view of the embodiment illustrated in FIG. 6, showing the thrust reverser door in its open, reverse thrust position.

In the alternative embodiment illustrated in FIGS. 6 and 7, the actuator 7a is again attached to the rear or downstream support frame 11 at 14. In this particular embodiment, however, the end of the piston rod of the actuator 7a is connected to one end of link rod 18 by pivot connection 15. The opposite end of the link rod 18 is pivotally connected to the thrust reverser door 7 by pivot 17. As can be seen in FIG. 6, when the thrust reverser door 7 is in its forward thrust position, the pivot 17 is located closer to the longitudinal axis L than is pivot connection 15.

As in the previously described embodiment, retraction of the piston rod of the actuator 7a causes the thrust reverser door 7 to pivot about axis 13 to the open, reverse thrust position illustrated in FIG. 7. Extension of the piston rod causes the thrust reverser door 7 to return to its closed, forward thrust position illustrated in FIG. 6.

In both embodiments of the invention, the mechanical stresses generated by the actuators 7a are absorbed through the attaching means 14 and the rear, downstream support frame 11. The invention also allows distribution of the stresses between the front, upstream frame 10 and the rear, downstream frame 11, thereby enabling the weight of the front, upstream frame 10 to be reduced over the known upstream support frames 6, thereby compensating for the additional weight of the rear, downstream frame 11, and resulting in an overall weight savings. The front, upstream frame 10 supports a large portion of the stresses from the thrust reverser weight, only part of these stresses passing through the pivot attachment 13, which also transmits the stresses arising in the forward thrust mode that are supported by the locking means, schematically illustrated at 19 in FIGS. 4 and 6, for the thrust reverser doors 7.

The rear, downstream frame 11 sustains all of the mechanical stresses passing through the actuators 7a, a portion of the stresses passing through the door pivot axis 13, as well as a portion of the weight induced stresses. The improved stress distribution of the structure according to this invention enables the improvement of the reliability and safety of the thrust reverser insofar as there are two paths for the stresses. In addition, the structure enables increased redundancy by using the rear, downstream support frame for any or all of a system required to maintain the operation of the thrust reverser in case of the malfunction of the primary systems on the front or rear support frames.

In addition, the present invention enables the reduction of flexural stresses caused by faring the actuator 7a located on the outer panel of thrust reverser door 7.

In regard to the embodiment illustrated in FIGS. 6 and 7, the link rod 18 acts as a toggle lever to allow the reduction of stresses at the onset of movement of the thrust reverser door to its reverse thrust positions while still being compatible with the closing of the thrust reverser doors 7.

The actuating means to move the thrust reversers between their open and closed positions may, alternatively, consist of a cable control system and the thrust reverser elements may be pivoting doors, as illustrated, or tipping baffles uncovering bypass grills.

The foregoing description is provided for illustrative purposes only and should not be construed as in any way limiting this invention, the scope of which is defined solely by the appended claims.

What is claimed is:

1. A thrust reverser for a turbojet engine having a wall bounding a duct with a longitudinal axis through which gases pass in a forward thrust direction, the wall having at least one reverse thrust opening through which gases pass in a reverse thrust direction, the opening having front and rear sides, the thrust reverser comprising:
   a) a thrust reverser element attached to the duct so as to be moveable between a forward thrust position wherein the thrust reverser element covers the reverse thrust opening and a reverse thrust position wherein the thrust reverser element is displaced away from the reverse thrust opening so as to deflect gases through the opening in a reverse thrust direction, wherein the thrust reverser element comprises a thrust reverser door, having front and rear edges, pivotally attached to the duct so as to pivot between open and closed positions about a pivot axis located between the front and rear edges;
   b) a first support frame extending generally transverse to the longitudinal axis and located forwardly of the front side of the reverse thrust opening;
   c) a second support frame extending generally transverse to the longitudinal axis and located rearwardly of the rear side of the reverse thrust opening;
   d) at least one generally longitudinally extending beam connected to the first and second support frames; and,
   e) actuating means connected to the thrust reverser element and to the second support frame to move the thrust reverser element between its open and closed positions.

2. The thrust reverser of claim 1 wherein the actuating means comprises an actuating cylinder having an extendible and retractable piston rod.

3. The thrust reverser of claim 2 wherein the actuating cylinder is attached to the second support frame and the piston rod is attached to the thrust reverser door.

4. The thrust reverser of claim 2 further comprising a link rod having a first end attached to the thrust reverser door and a second end attached to the piston rod of the actuating cylinder.

5. The thrust reverser of claim 4 wherein the attachment point of the first end of the link rod is closer to the longitudinal axis than the attachment point of the second end when the thrust reverser door is in the closed, forward thrust position.

* * * * *